United States Patent
Yamazaki et al.

(10) Patent No.: US 9,989,404 B2
(45) Date of Patent: Jun. 5, 2018

(54) PORTABLE TERMINAL, PORTABLE-TERMINAL CONDITION DETERMINING SYSTEM, STORAGE MEDIUM, AND PORTABLE-TERMINAL CONDITION DETERMINING METHOD

(71) Applicant: FUJI XEROX CO., LTD., Tokyo (JP)

(72) Inventors: Shinya Yamazaki, Yokohama (JP); Toru Fuse, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 359 days.

(21) Appl. No.: 14/802,746

(22) Filed: Jul. 17, 2015

(65) Prior Publication Data
US 2015/0323378 A1 Nov. 12, 2015

Related U.S. Application Data

(63) Continuation of application No. PCT/JP2013/079081, filed on Oct. 28, 2013.

(30) Foreign Application Priority Data

May 31, 2013 (JP) ................................ 2013-115307

(51) Int. Cl.
*G01K 1/00* (2006.01)
*G01P 15/00* (2006.01)
(Continued)

(52) U.S. Cl.
CPC ............... *G01H 1/00* (2013.01); *G01P 15/00* (2013.01); *H04M 1/02* (2013.01); *H04M 1/72569* (2013.01); *H04M 19/047* (2013.01)

(58) Field of Classification Search
CPC combination set(s) only.
See application file for complete search history.

(56) References Cited

U.S. PATENT DOCUMENTS

2007/0169130 A1* 7/2007 Wu .................... G06F 1/187
720/600
2008/0132196 A1 6/2008 Soh et al.
(Continued)

FOREIGN PATENT DOCUMENTS

JP 2008092164 A 4/2008
JP 2009206856 A 9/2009
(Continued)

OTHER PUBLICATIONS

Dec. 3, 2013 International Search Report issued in International Application No. PCT/JP2013/079081.
(Continued)

*Primary Examiner* — Mamadou Diallo
(74) *Attorney, Agent, or Firm* — Oliff PLC

(57) ABSTRACT

A portable terminal includes: an acceleration measuring unit that measures acceleration of the portable terminal; a calculating unit that calculates a first feature value for in-plane directions in which the portable terminal is in contact with an object and a second feature value for an out-of-plane direction on the basis on the acceleration measured by the acceleration measuring unit in a state in which the portable terminal is put on the object, when the portable terminal is vibrated; and a specifying unit that specifies a material of the object on the basis of the first feature value and the second feature value.

7 Claims, 9 Drawing Sheets

(51) Int. Cl.
*G01H 1/00* (2006.01)
*H04M 1/02* (2006.01)
*H04M 19/04* (2006.01)
*H04M 1/725* (2006.01)

(56) References Cited

U.S. PATENT DOCUMENTS

| | | | |
|---|---|---|---|
| 2011/0177848 A1* | 7/2011 | Tanabe | G01C 22/006 |
| | | | 455/575.1 |
| 2012/0051888 A1* | 3/2012 | Mizoue | F03D 11/0091 |
| | | | 415/118 |
| 2012/0096249 A1 | 4/2012 | Rubin et al. | |
| 2012/0318056 A1* | 12/2012 | Izumi | G01L 9/0008 |
| | | | 73/146.3 |
| 2013/0043987 A1 | 2/2013 | Kasama et al. | |

FOREIGN PATENT DOCUMENTS

| | | |
|---|---|---|
| JP | 2010056944 A | 3/2010 |
| JP | 2010166274 A | 7/2010 |
| JP | 2010200036 A | 9/2010 |
| JP | 2013042326 A | 2/2013 |
| JP | 2013077969 A | 4/2013 |

OTHER PUBLICATIONS

Jul. 29, 2016 Office Action issued in Australian Patent Application No. 2013390859.

* cited by examiner

| MATERIAL ID | DESCRIPTION ABOUT MATERIAL | COEFFICIENT OF FRICTION | COEFFICIENT OF RESTITUTION |
|---|---|---|---|
| 0001 | CARPET | $\mu_{A1}$ TO $\mu_{A2}$ | $e_{A1}$ TO $e_{A2}$ |
| 0002 | PLASTIC | $\mu_{B1}$ TO $\mu_{B2}$ | $e_{B1}$ TO $e_{B2}$ |
| 0003 | DASHBOARD | $\mu_{C1}$ TO $\mu_{C2}$ | $e_{C1}$ TO $e_{C2}$ |
| | | | |

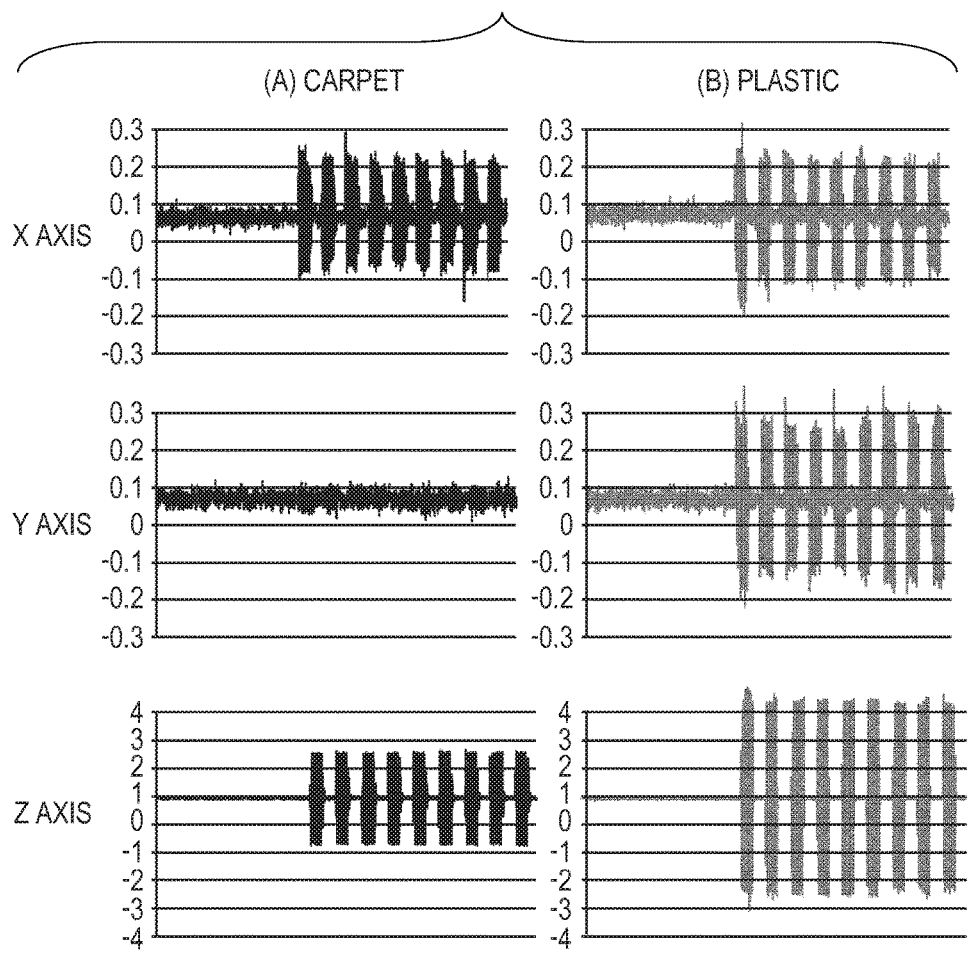

FIG. 4C

| MATERIAL ID | DESCRIPTION ABOUT MATERIAL | XY-PLANE ACCELERATION AMPLITUDE | XY-PLANE ACCELERATION VARIATIONS | Z-DIRECTION ACCELERATION AMPLITUDE |
|---|---|---|---|---|
| 0001 | CARPET | $A_{d1}$ TO $A_{d2}$ | $\sigma_1$ TO $\sigma_2$ | $A_{c1}$ TO $A_{c2}$ |
| 0002 | PLASTIC | $A_{d3}$ TO $A_{d4}$ | $\sigma_3$ TO $\sigma_4$ | $A_{c3}$ TO $A_{c4}$ |
| 0003 | DASHBOARD | $A_{d5}$ TO $A_{d6}$ | $\sigma_5$ TO $\sigma_6$ | $A_{c5}$ TO $A_{c6}$ |
|  |  |  |  |  |

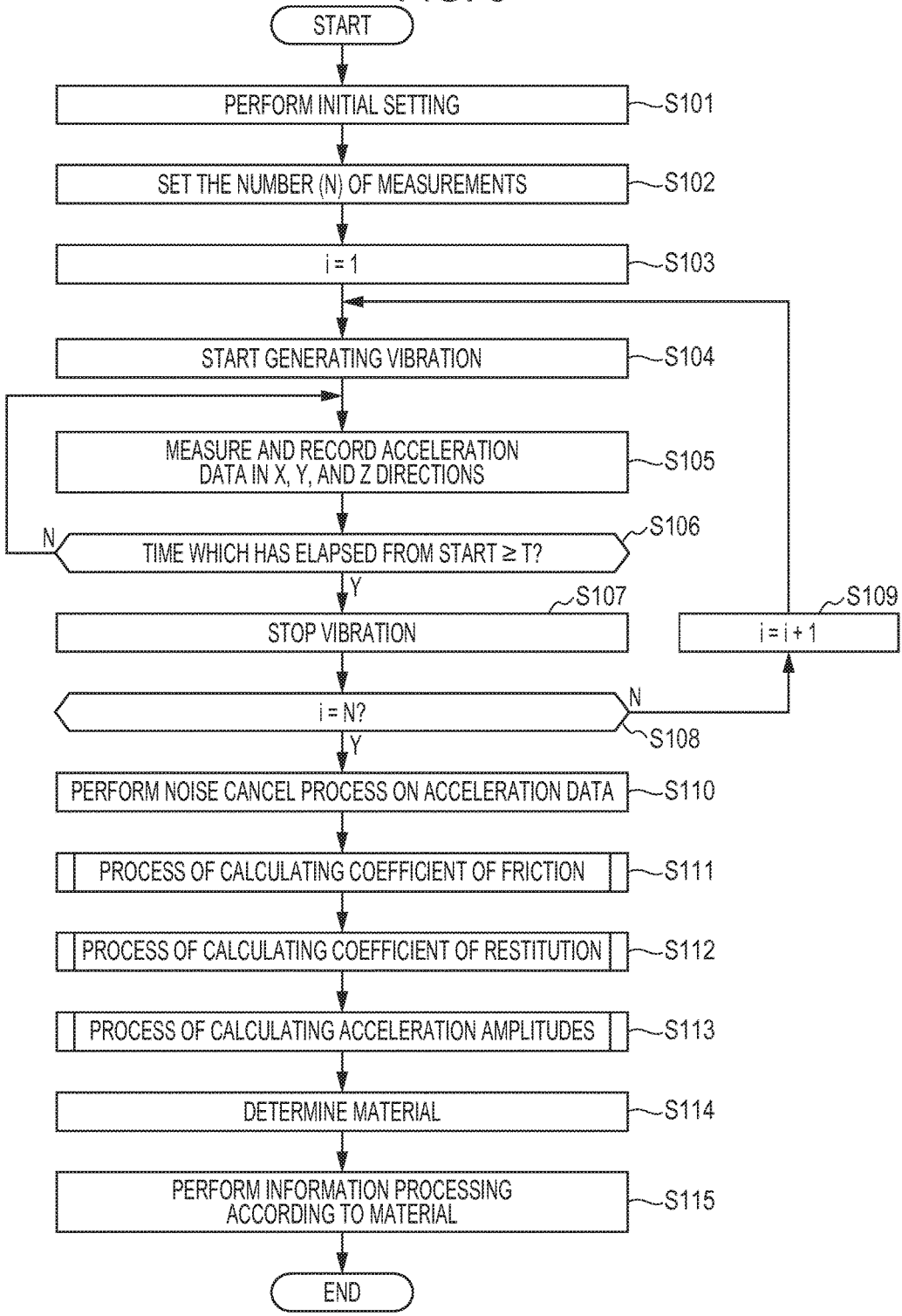

PORTABLE TERMINAL, PORTABLE-TERMINAL CONDITION DETERMINING SYSTEM, STORAGE MEDIUM, AND PORTABLE-TERMINAL CONDITION DETERMINING METHOD

CROSS REFERENCE TO RELATED APPLICATION

This is a continuation of International Application No. PCT/JP2013/079081 filed on Oct. 28, 2013, and claims priority from Japanese Patent Application No. 2013-115307, filed on May 31, 2013, the entire disclosures of which are incorporated herein by reference.

BACKGROUND

1. Technical Field

The present invention relates to a portable terminal, a portable-terminal condition determining system, a storage medium, and a portable-terminal condition determining method.

2. Related Art

There is a portable terminal provided with a vibration generating function for notifying a user of occurrence of an event such as an incoming call.

SUMMARY

As aspect of the present invention provides a portable terminal comprising: an acceleration measuring unit that measures acceleration of the portable terminal; a calculating unit that calculates a first feature value for in-plane directions in which the portable terminal is in contact with an object and a second feature value for an out-of-plane direction on the basis on the acceleration measured by the acceleration measuring unit in a state in which the portable terminal is put on the object, when the portable terminal is vibrated; and a specifying unit that specifies a material of the object on the basis of the first feature value and the second feature value.

BRIEF DESCRIPTION OF THE DRAWINGS

Exemplary embodiment(s) of the present invention will be described in detail based on the following figures, wherein:

FIG. 4A includes diagrams illustrating an example of pieces of data about acceleration in the three axis directions for each material;

FIG. 4B is a diagram illustrating an exemplary second material-characteristics data table;

FIG. 4C is a diagram illustrating another exemplary second material-characteristics data table;

FIG. 5 is a flowchart of a material determining process;

DETAILED DESCRIPTION

An embodiment for carrying out the present invention (hereinafter referred to as an embodiment) will be described below according to the drawings. A portable terminal 1 according to the present embodiment is provided with a function of vibration (vibration function), and determines the material of an object on which the portable terminal 1 is put, on the basis of data about acceleration measured when the portable terminal 1 is vibrated.

[1. Description of Functional Block Diagram]

Figure 1:
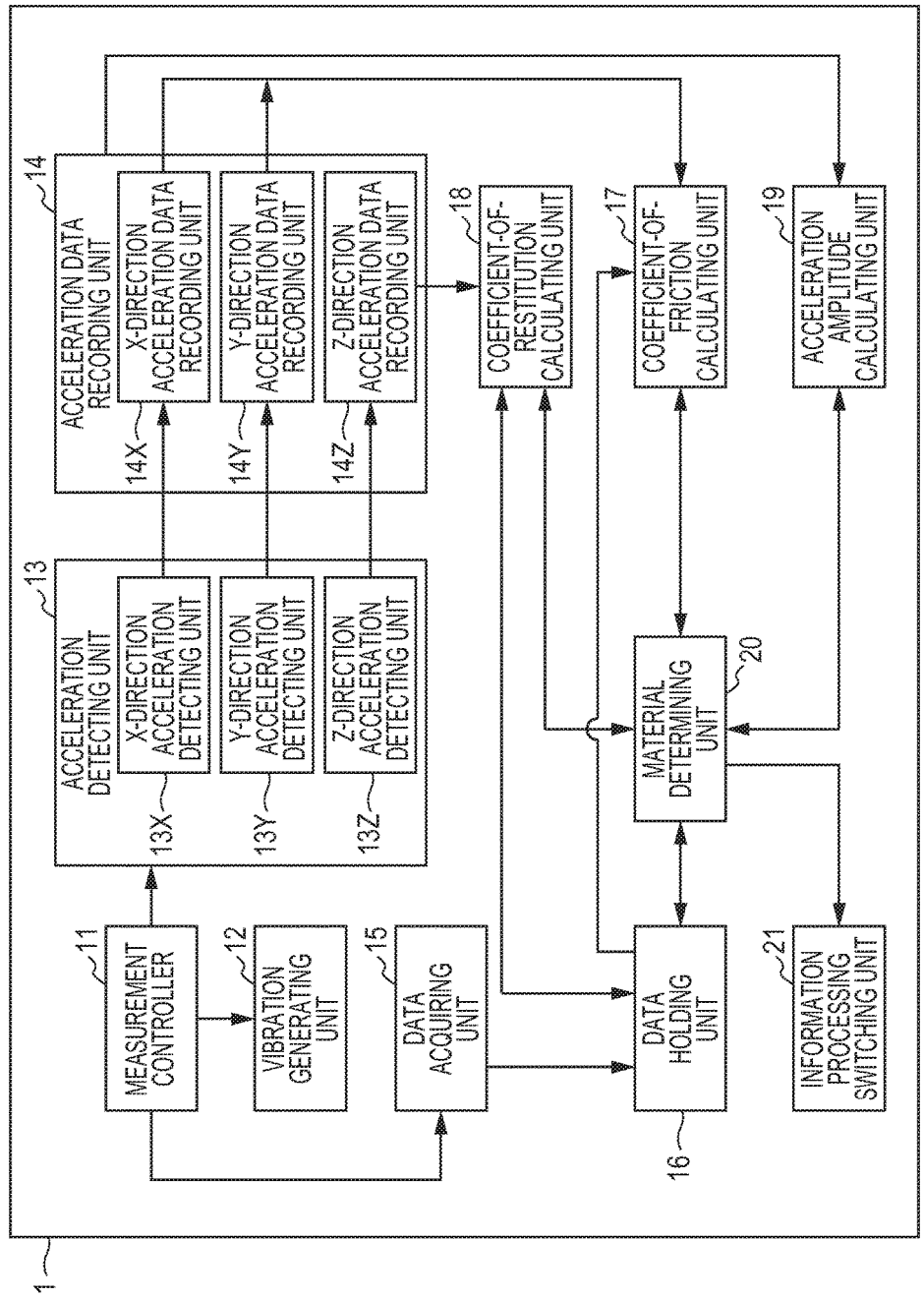
FIG. 1 is a functional block diagram of a portable terminal according to the present embodiment.

FIG. 1 is a functional block diagram of the portable terminal 1 according to the present embodiment. As illustrated in FIG. 1, the portable terminal 1 includes a measurement controller 11, a vibration generating unit 12, an acceleration detecting unit 13, an acceleration data recording unit 14, a data acquiring unit 15, a data holding unit 16, a coefficient-of-friction calculating unit 17, a coefficient-of-restitution calculating unit 18, an acceleration amplitude calculating unit 19, a material determining unit 20, and an information processing switching unit 21.

The functions of the above-described units provided for the portable terminal 1 may be implemented in such a manner that a computer provided with a control unit such as a CPU, a memory unit such as a memory, a communication unit for receiving/transmitting data from/to an external device, a vibration generator (vibrator), acceleration sensors detecting acceleration in the three directions, and the like reads programs stored in a computer-readable information storage medium and executes the programs. The programs may be supplied to the portable terminal 1 which is a computer, through an information storage medium, such as an optical disk, a magnetic disk, a magnetic tape, a magneto-optical disk, or a flash memory, or may be supplied to the portable terminal 1 via a data communication network such as the Internet. The portable terminal 1 may be a portable telephone (including a feature phone and a smart phone), a tablet terminal, a notebook personal computer, a PDA, or the like.

The measurement controller 11 controls start and stop of a measurement, start and stop of a vibration generated by the vibration generating unit 12, and the like. For example, when a timing at which a measurement is to be performed comes, the measurement controller 11 sets a measurement condition (such as the number of measurements and a vibration time), and causes the vibration generating unit 12 to start and stop a vibration in accordance with the measurement condition which has been set. The timing at which a measurement is to be performed may come at predetermined time intervals, may be a timing at which a predetermined event occurs in the portable terminal 1, or may be a timing at which the portable terminal 1 receives a predetermined signal from another device.

The vibration generating unit 12 which includes, for example, a weight and a motor which rotates the weight vibrates the portable terminal 1 in accordance with the control exerted by the measurement controller 11. The vibration generating unit 12 performs a process of starting a vibration at a timing T1 specified by the measurement controller 11, continuing the vibration till a timing T2 (<T1) specified by the measurement controller 11, and then stopping the vibration. The vibration generating unit 12 repeatedly performs the process for a specified number of iterations.

The acceleration detecting unit 13 which includes, for example, acceleration sensors detects acceleration of the portable terminal 1. The acceleration detecting unit 13 which includes an X-direction acceleration detecting unit 13X, a Y-direction acceleration detecting unit 13Y, and a Z-direction acceleration detecting unit 13Z detects acceleration in the three directions which are the in-plane directions on the mounting surface of the portable terminal 1 on which the object is disposed and the out-of-plane direction (for example, the normal direction) with respect to the mounting surface. In the present embodiment, the X and Y directions correspond to the in-plane directions on the mounting surface (the front surface on which the display is disposed or the back surface) of the portable terminal 1, and the Z direction corresponds to the normal direction with respect to the mounting surface.

The acceleration data recording unit 14 records acceleration data obtained through the detection performed by the acceleration detecting unit 13 on the basis of a vibration generated by the vibration generating unit 12 in accordance with the control exerted by the measurement controller 11, in such a manner that the acceleration data is associated with time. The acceleration data recording unit 14 which includes an X-direction acceleration data recording unit 14X, a Y-direction acceleration data recording unit 14Y, and a Z-direction acceleration data recording unit 14Z records pieces of data about acceleration in the three directions, which are the in-plane directions (X and Y directions) on the mounting surface of the portable terminal 1 and the normal direction (Z direction) with respect to the mounting surface, in such a manner that the pieces of acceleration data are associated with the respective measurement times.

The data acquiring unit 15 acquires data (utilization data) used in a process of determining the material of the object on which the portable terminal 1 is put. The data acquiring unit 15 may download the utilization data from a predetermined device (server), or may read the utilization data from a storage medium storing the utilization data. For example, in the case where communication with the predetermined device is enabled when a measurement is to be started, the data acquiring unit 15 may download the latest utilization data from the predetermined device. In the case where communication with the predetermined device is disabled, the data acquiring unit 15 may use utilization data which has been already acquired.

For example, the utilization data acquired by the data acquiring unit 15 includes information, which is obtained at time intervals, about progression of forces exerted in the X, Y, and Z directions due to a vibration generated by the vibration generating unit 12, data describing the ranges of a coefficient of friction and a coefficient of restitution for each material, and data describing the ranges of acceleration amplitudes in the X, Y, and Z directions for each material.

The data holding unit 16 holds the utilization data acquired by the data acquiring unit 15. Example data held by the data holding unit 16 will be described below.

Figures 2, 3:
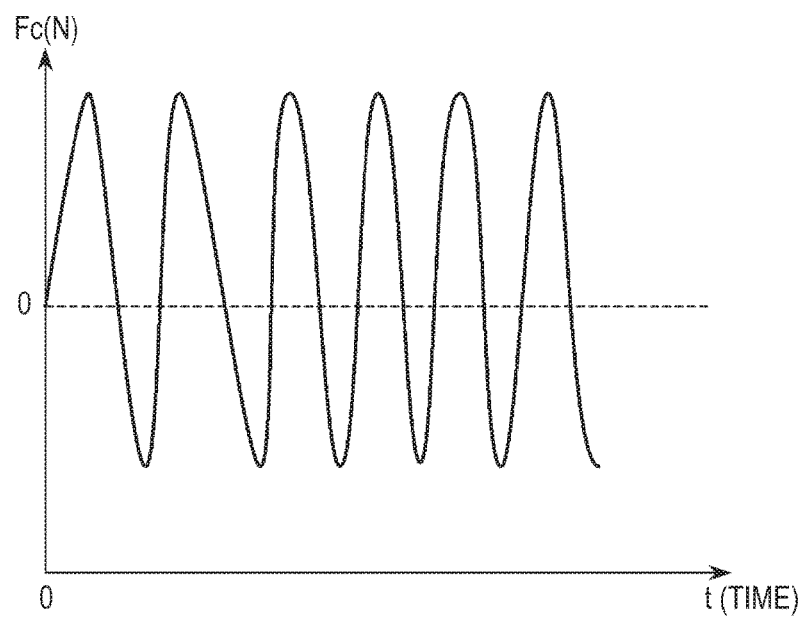
FIG. 2 is a diagram illustrating example data of a force exerted by a vibration generating unit.
FIG. 3 is a diagram illustrating an exemplary first material-characteristics data table.

FIG. 2 illustrates example data which is about force exerted by the vibration generating unit 12 and which is held by the data holding unit 16. In the example illustrated in FIG. 2, the horizontal axis represents time t (a vibration is started when t=0), and the vertical axis represents force (N). The data about force exerted by the vibration generating unit 12 may be predetermined for each of the models of portable terminals.

FIG. 3 illustrates an exemplary first material-characteristics data table held by the data holding unit 16. In the first material-characteristics data table illustrated in FIG. 3, the material ID for identifying a material, information describing the material, the range of a possible value of the coefficient of friction of the material, and the range of a possible value of the coefficient of restitution of the material are stored so as to be associated with one another.

FIG. 4A illustrates pieces of example data about acceleration in the three axis directions for each material. FIG. 4A illustrates data about acceleration in the X, Y, and Z directions which is obtained when the material is a carpet (A), and data about acceleration in the X, Y, and Z directions which is obtained when the material is a plastic (B). As illustrated in FIG. 4A, the carpet (A) has a grain, and has directivity in ease of movement in the in-plane directions. In contrast, the plastic (B) does not have directivity in ease of movement in the in-plane directions. In addition, the carpet (A) is softer than the plastic (B). Therefore, the acceleration in the Z direction for the carpet (A) is smaller than that for the plastic. Thus, a combination of possible values of three-axis acceleration data is different depending on a material. FIGS. 4B and 4C illustrate an exemplary acceleration feature determined for each material by focusing on the point in which a combination of possible values of three-axis acceleration data is different depending on a material.

FIG. 4B illustrates an exemplary second material-characteristics data table held by the data holding unit 16. In the second material-characteristics data table illustrated in FIG. 4B, the material ID for identifying a material, information describing the material, the range of a possible value of the acceleration amplitude in the X direction, the range of a possible value of the acceleration amplitude in the Y direction, and the range of a possible value of the acceleration amplitude in the Z direction are stored so as to be associated with one another.

FIG. 4C illustrates another exemplary second material-characteristics data table held by the data holding unit 16. In the second material-characteristics data table illustrated in FIG. 4C, the material ID for identifying a material, information describing the material, the range of a possible value of the acceleration amplitude in the XY plane, variations (deviation, variance) in acceleration in the XY plane, and the range of a possible value of the acceleration amplitude in the Z direction are stored so as to be associated with one another.

The coefficient-of-friction calculating unit 17 calculates the coefficient of friction (coefficient of kinetic friction) between the object on which the portable terminal 1 is put and the portable terminal 1 on the basis of the data of the portable terminal 1 about acceleration in the in-plane directions on the mounting surface of the portable terminal 1. For example, the coefficient-of-friction calculating unit 17 may calculate the coefficient of friction in the X direction on the basis of the data of the portable terminal 1 about acceleration in the X direction which is recorded by the X-direction acceleration data recording unit 14X and on the basis of data which is about force in the X direction exerted by the vibration generating unit 12 and which is held by the data holding unit 16. The coefficient-of-friction calculating unit 17 may also calculate the coefficient of friction in the Y direction on the basis of the data of the portable terminal 1 about acceleration in the Y direction which is recorded by the Y-direction acceleration data recording unit 14Y and on the basis of the data which is about force in the Y direction exerted by the vibration generating unit 12 and which is held by the data holding unit 16. The process of calculating a coefficient of friction will be described below in detail.

The coefficient-of-restitution calculating unit 18 calculates the coefficient of restitution between the surface on which the portable terminal 1 is put and the portable terminal 1 on the basis of the data of the portable terminal 1 about acceleration in the normal direction with respect to the mounting surface of the portable terminal 1. For example, the coefficient-of-restitution calculating unit 18 may calculate the coefficient of restitution in the Z direction on the basis of speeds in the normal direction with respect to the mounting surface which are obtained before and after a collision on the basis of the data of the portable terminal 1 about acceleration in the Z direction which is recorded by the Z-direction acceleration data recording unit 14Z. The process of calculating a coefficient of restitution will be also described below in detail.

The acceleration amplitude calculating unit 19 calculates amplitudes of acceleration produced when a vibration is generated, on the basis of the acceleration data recorded by the acceleration data recording unit 14. For example, the acceleration amplitude calculating unit 19 may calculate an acceleration amplitude in the X direction on the basis of the data of the portable terminal 1 about acceleration in the X direction which is recorded by the X-direction acceleration data recording unit 14X, may calculate an acceleration amplitude in the Y direction on the basis of the data of the portable terminal 1 about acceleration in the Y direction which is recorded by the Y-direction acceleration data recording unit 14Y, and may calculate an acceleration amplitude in the Z direction on the basis of the data of the portable terminal 1 about acceleration in the Z direction which is recorded by the Z-direction acceleration data recording unit 14Z. The acceleration amplitude calculating unit 19 may calculate an acceleration amplitude in the XY plane, and variations in acceleration in the X and Y directions in the XY plane.

The material determining unit 20 determines the material of the object on which the portable terminal 1 is put, on the basis of at least one of the coefficient of friction calculated by the coefficient-of-friction calculating unit 17, the coefficient of restitution calculated by the coefficient-of-restitution calculating unit 18, and acceleration amplitude data calculated by the acceleration amplitude calculating unit 19.

For example, when the coefficient of friction and the coefficient of restitution are used to determine a material, the material determining unit 20 may search the first material-characteristics data table for a material such that the coefficient of friction calculated by the coefficient-of-friction calculating unit 17 and the coefficient of restitution calculated by the coefficient-of-restitution calculating unit 18 fall within the respective ranges for the material. When such a material is retrieved, the material determining unit 20 may determine the retrieved material to be the material of the object on which the portable terminal 1 is put.

For example, when the three-axis acceleration amplitudes are used to determine a material, the material determining unit 20 may search the second material-characteristics data table for a material such that the three-axis acceleration amplitudes fall within the respective ranges for the material. When such a material is retrieved, the material determining unit 20 may determine the retrieved material to be the material of the object on which the portable terminal 1 is put.

For example, when the coefficient of friction, the coefficient of restitution, and the three-axis acceleration amplitudes are used to determine a material, the material determining unit 20 may determine that, among materials retrieved on the basis of the coefficient of friction and the coefficient of restitution, a material which includes a material retrieved on the basis of the three-axis acceleration amplitudes is the material of the object on which the portable terminal 1 is put. Alternatively, the material determining unit 20 may determine that a material included in either one of a material set retrieved on the basis of the coefficient of friction and the coefficient of restitution and a material set retrieved on the basis of the three-axis acceleration amplitudes is the material of the object on which the portable terminal 1 is put.

The information processing switching unit 21 performs information processing in accordance with the material determined by the material determining unit 20. For example, in the case where the material determined by the material determining unit 20 is a predetermined material (for example, a material used in the dashboard of a vehicle) and where the amount of movement in an in-plane direction which is calculated by the acceleration data recording unit 14 exceeds a threshold, the information processing switching unit 21 may cause the portable terminal 1 to output warning information (for example, emission of alert sound).

[2. Description of Flowcharts]

Example processes performed by the portable terminal 1 according to the present embodiment will be described below by referring to the flowcharts illustrated in FIGS. 5 to 8.

[2-1. Material Determining Process]

FIG. 5 is a flowchart of a material determining process of determining the material of an object on which the portable terminal 1 is put, which is performed by the portable terminal 1. The material determining process described below may be performed by the portable terminal 1 at a regular timing or when a predetermined event (for example, when a signal to make determination is received or when a strong impact is detected) is detected.

As illustrated in FIG. 5, the portable terminal 1 performs initial setting, such as setting of a vibration pattern (a data table, a vibration time) and setting of the mass m of the portable terminal 1, according to the model and/or environment (S101), and also sets the number (N) of measurements (S102). The number N of measurements may be an integer equal to or more than 1.

The portable terminal 1 initializes a variable i to 1 (S103), and starts generating a vibration by the vibration generating unit 12 (S104). The portable terminal 1 sequentially measures pieces of acceleration data in the X, Y, and Z directions by using respective acceleration sensors, and records the acceleration data in association with time (S105).

If the time which has elapsed from start of the vibration is less than a threshold T (S106: N), the portable terminal 1 continues to generate the vibration, and returns back to S105 to record the three-axis acceleration data. If the time which has elapsed from start of the vibration is equal to or more than the threshold T (S106: Y), the portable terminal 1 stops the vibration (S107).

After the vibration is stopped, if the variable i does not reach N (S108: N), the portable terminal 1 may increment (adds 1 to) the variable i (S109), and may wait for a predetermined time interval. After that, the portable terminal 1 may start the process in S104. If the variable i reaches N in S108 (S108: Y), the portable terminal 1 performs a noise cancel process on the recorded acceleration data (S110). After that, the portable terminal 1 performs a process of calculating a coefficient of friction on the basis of the recorded acceleration data (S111). The detail of the process of calculating a coefficient of friction will be described on the basis of the flowchart illustrated in FIG. 6.

[2-2. Coefficient-of-Friction Calculating Process]

Figure 6:
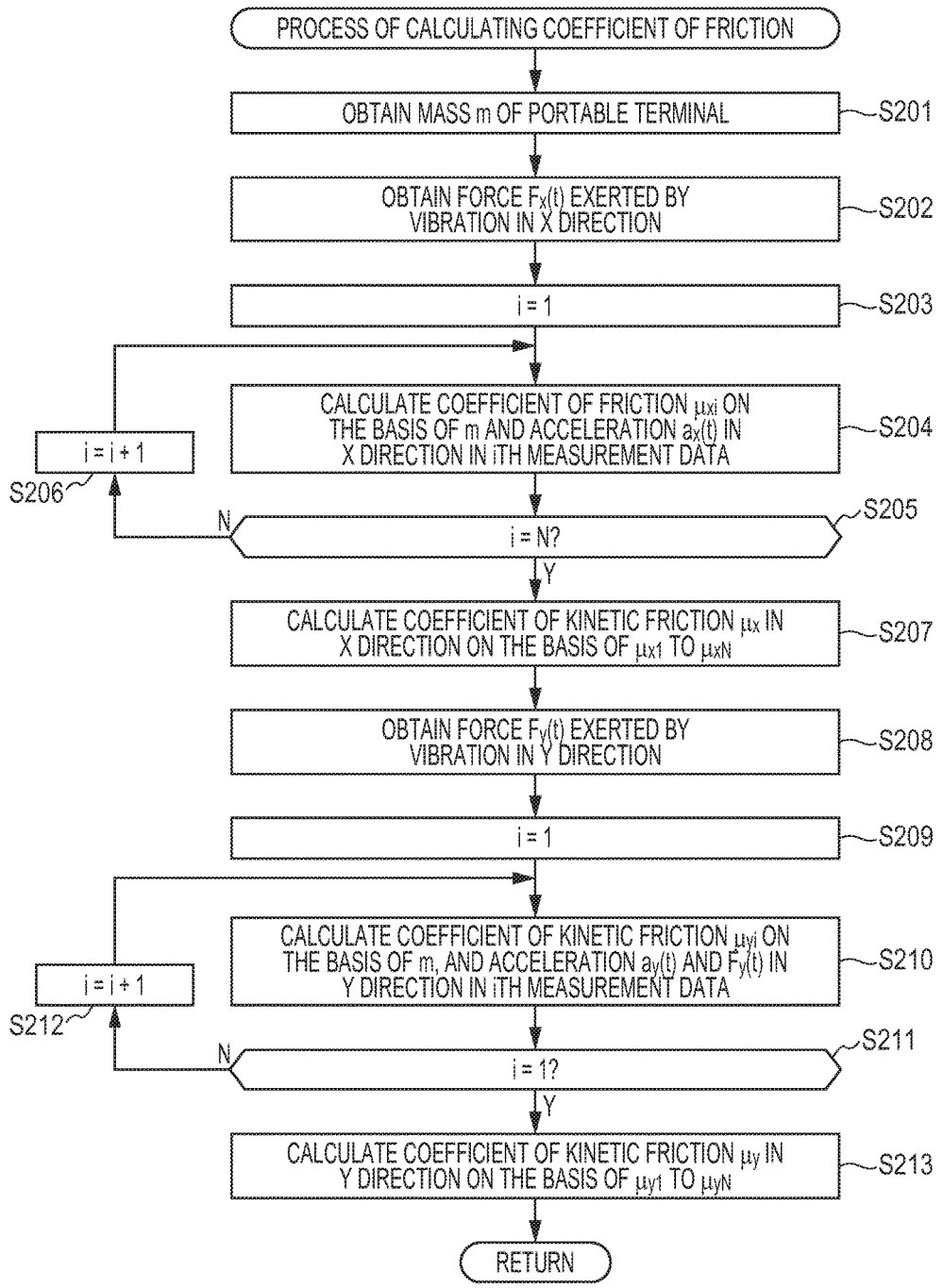
FIG. 6 is a flowchart of a coefficient-of-friction calculating process.

FIG. 6 is a flowchart of the coefficient-of-friction calculating process. As illustrated in FIG. 6, the portable terminal 1 obtains the mass m of the portable terminal 1 (S201), and obtains data about force $F_x(t)$ exerted by the vibration in the X direction from the data holding unit 16 (S202).

The portable terminal 1 initializes a variable i to 1 (S203), and calculates a coefficient of kinetic friction $\mu_{xi}$ on the basis of the acceleration $a_x(t)$ and the force $F_x(t)$ in the X direction which are obtained in the i-th measurement data and on the basis of the mass m (S204). The time t is set to 0 when the vibration is started. The process of calculating a coefficient of kinetic friction may be performed on the basis of a physical model illustrated in FIG. 9.

Figure 9:
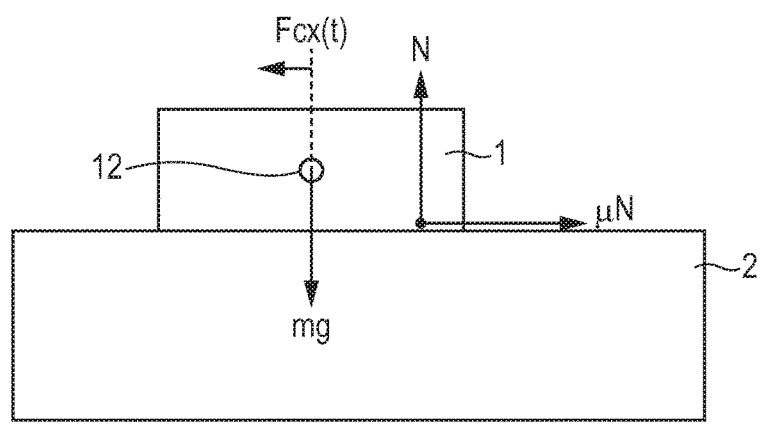
FIG. 9 is a diagram illustrating an exemplary physical model for calculating a coefficient of friction.

An example of the physical model illustrated in FIG. 9 is made under the following assumptions. The portable terminal 1 is put on an object 2. Since the mass M of the object 2 is sufficiently heavy compared with the mass m of the portable terminal 1, the mass of the object 2 is infinite (the object is fixed). Since the vibration generator (vibrator) provided for the portable terminal 1 is sufficiently light compared with the mass m of the portable terminal 1, the mass of the vibration generating unit 12 is infinitesimal (0). A change in movement in the Z direction is not considered, and $F_{cx}(t)$ functions with predetermined force. The portable terminal 1, the object 2, and the vibration generating unit 12 are rigid bodies. In this case, a coefficient of kinetic friction $\mu$ in the X direction is calculated by using Expression (1) described below. The symbol N represents a normal reaction and is equal to mg.

[Math. 1]

$$\mu = (F_{cx}(t) - ma_x(t))/mg \tag{1}$$

If the variable i does not reach N (S205: N), the portable terminal 1 increments (adds 1 to) the variable i (S206), and returns back to S204. If the variable i reaches N (S205: Y), the portable terminal 1 proceeds to S207.

The portable terminal 1 calculates a coefficient of kinetic friction $\mu_x$ in the X direction on the basis of the coefficients of kinetic friction $\mu_{x1}$ to $\mu_{xN}$ calculated for the first to N-th measurements (S207). For example, the portable terminal 1 may calculate the average of $\mu_{x1}$ to $\mu_{xN}$ as $\mu_x$.

The portable terminal 1 obtains data about force $F_y(t)$ exerted by the vibration in the Y direction from the data holding unit 16 (S208), and initializes the variable i to 1 (S209). The portable terminal 1 calculates a coefficient of kinetic friction $\mu_{yi}$ on the basis of the acceleration $a_y(t)$ and the force $F_y(t)$ in the Y direction which are obtained from the i-th measurement data and on the basis of the mass m by using Expression (1) (S210). The time t is set to 0 when the vibration is started.

If the variable i does not reach N (S211: N), the portable terminal 1 increments (adds 1 to) the variable i (S212), and returns back to S210. If the variable i reaches N (S211: Y), the portable terminal 1 proceeds to S213.

The portable terminal 1 calculates a coefficient of kinetic friction $\mu_y$ in the Y direction on the basis of the coefficients of kinetic friction $\mu_{y1}$ to $\mu_{yN}$ calculated for the first to N-th measurements (S213), and returns. For example, the portable terminal 1 may calculate the average of $\mu_{y1}$ to $\mu_{yN}$ as $\mu_y$.

Returning back to the flowchart in FIG. 5, description will be continued. When the process of calculating a coefficient of friction is completed, the portable terminal 1 performs a process of calculating a coefficient of restitution on the basis of the recorded acceleration data (S112). The detail of the process of calculating a coefficient of restitution will be described on the basis of the flowchart illustrated in FIG. 7.

[2-3. Coefficient-of-Restitution Calculating Process]

Figure 7:
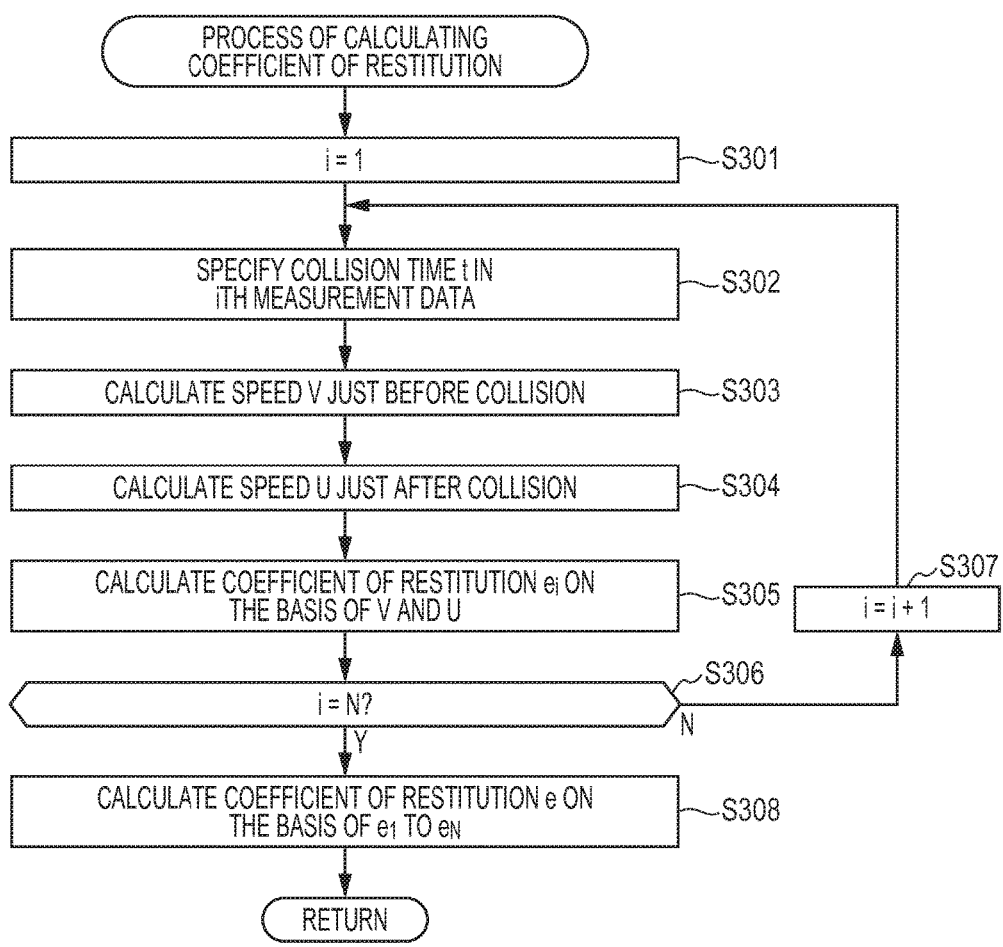
FIG. 7 is a flowchart of a coefficient-of-restitution calculating process.

As illustrated in FIG. 7, the portable terminal 1 initializes a variable i to 1 (S301), and calculates a collision time $t_1$ at which the portable terminal 1 collides against the object, on the basis of the acceleration $a_z(t)$ in the Z direction in the i-th measurement data (S302). The time t is set to 0 when the vibration is started, and the coordinate position in the Z direction is set to 0 when the vibration is started.

The portable terminal 1 calculates a speed V at $t_{1A}$ ($t_{1A} = t_1 - \Delta t$) just before the collision time $t_1$, on the basis of the acceleration $a_z(t)$ in the Z direction in the i-th measurement data by using Expression (2) described below (S303), and calculates a speed U at $t_{1B}$ ($t_{1B} = t_1 + \Delta t$) just after the collision time $t_1$ by using Expression (3) described below (S304). The portable terminal 1 calculates a coefficient of restitution $e_i$ on the basis of the calculated speeds V and U by using Expression (4) (S305).

[Math. 2]

$$V = \int_0^{t_{1A}} a(t)\,dt \tag{2}$$

[Math. 3]

$$U = \int_0^{t_{1B}} a(t)\,dt \tag{3}$$

[Math. 4]

$$e_i = \sqrt{\frac{U}{V}} \tag{4}$$

If the variable i does not reach N (S306: N), the portable terminal 1 increments (adds 1 to) the variable i (S307), and returns back to S302. If the variable i reaches N (S306: Y), the portable terminal 1 proceeds to S308.

The portable terminal 1 calculates a coefficient of restitution e on the basis of the coefficients of restitution $e_1$ to $e_N$ calculated for the first to N-th measurements (S308), and returns. For example, the portable terminal 1 may calculate the average of $e_1$ to $e_N$ as e.

Returning back to the flowchart in FIG. 5, description will be continued. When the process of calculating a coefficient of restitution is completed, the portable terminal 1 performs a process of calculating acceleration amplitudes on the basis of the recorded acceleration data (S113). The detail of the process of calculating acceleration amplitudes will be described on the basis of the flowchart illustrated in FIG. 8.

[2-4. Acceleration-Amplitudes Calculating Process]

Figure 8:
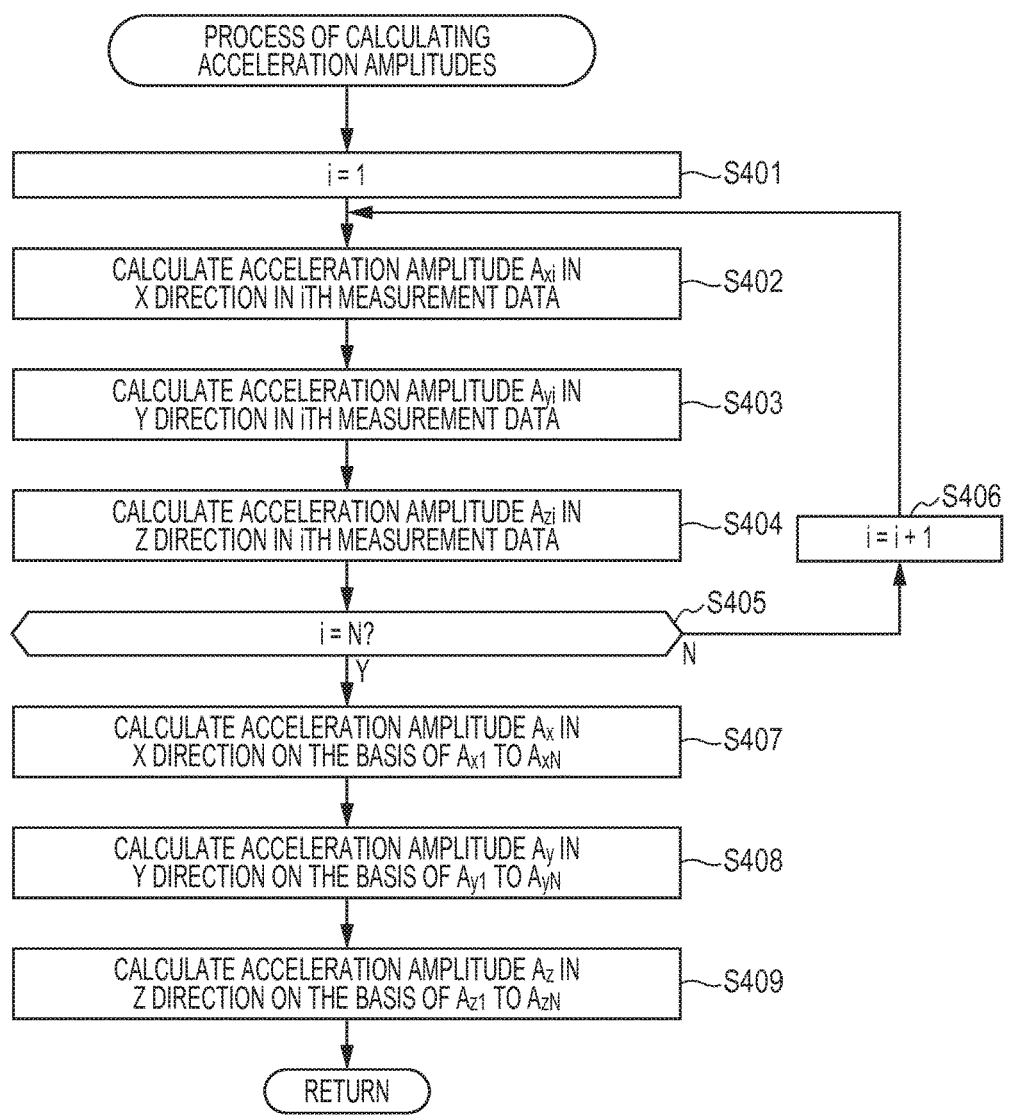
FIG. 8 is a flowchart of an acceleration-amplitudes calculating process.

As illustrated in FIG. 8, the portable terminal 1 initializes a variable i to 1 (S401). The portable terminal 1 calculates an acceleration amplitude $A_{xi}$ in the X direction in the i-th measurement data (S402), calculates an acceleration amplitude $A_{yi}$ in the Y direction in the i-th measurement data (S403), and calculates an acceleration amplitude $A_{zi}$ in the Z direction in the i-th measurement data (S404). An acceleration amplitude is set to the difference between the maximum value and the minimum value of acceleration which periodically appear.

If the variable i does not reach N (S405: N), the portable terminal 1 increments (adds 1 to) the variable i (S406), and returns back to S402. If the variable i reaches N (S405: Y), the portable terminal 1 proceeds to S407.

The portable terminal 1 calculates an acceleration amplitude $A_x$ in the X direction on the basis of the acceleration amplitudes $A_{x1}$ to $A_{xN}$ in the X direction which are calculated for the first to N-th measurements (S407), calculates an acceleration amplitude $A_y$ in the Y direction on the basis of the acceleration amplitudes $A_{y1}$ to $A_{yN}$ in the Y direction which are calculated for the first to N-th measurements (S408), calculates an acceleration amplitude $A_z$ in the Z direction on the basis of the acceleration amplitudes $A_{z1}$ to $A_{zN}$ in the Z direction which are calculated for the first to N-th measurements (S409), and returns. For example, the portable terminal 1 may calculate the average of $A_{x1}$ to $A_{xN}$ as $A_x$; the average of $A_{y1}$ to $A_{yN}$ as $A_y$; and the average of $A_{z1}$ to $A_{zN}$ as $A_z$.

Returning back to the flowchart in FIG. 5, description will be continued. When the process of calculating acceleration amplitudes is completed, the portable terminal 1 determines the material of the object on which the portable terminal 1 is put, on the basis of at least one of the coefficient of friction, the coefficient of restitution, and the acceleration amplitude data which have been calculated (S114). A specific example of the process of determining a material will be described below.

When the coefficient of friction and the coefficient of restitution are used to determine the material, the portable terminal 1 searches the first material-characteristics data table for identification information (material ID) of a material such that the coefficient of friction calculated in S111 and the coefficient of restitution calculated in S112 fall within the respective ranges for the material. If identification information (material ID) of a material such that the coefficient of friction calculated in S111 and the coefficient of restitution calculated in S112 fall within the respective ranges for the material is not retrieved, the portable terminal 1 may return an error or may determine the material by using the three-axis acceleration amplitudes calculated in S113.

When the three-axis acceleration amplitudes are used to determine the material, the portable terminal 1 searches the second material-characteristics data table for identification information (material ID) of a material such that the three-axis acceleration amplitudes (acceleration amplitudes in the X, Y, and Z directions) calculated in S113 fall within the respective ranges for the material. When the magnitude of an acceleration amplitude in the XY plane and the range of the amounts of change (deviations) in acceleration in the X and Y directions are stored in the second material-characteristics data table, the portable terminal 1 may calculate the magnitude $A_{xy}$ of an acceleration amplitude in the XY plane on the basis of an acceleration amplitude in the X direction and an acceleration amplitude in the Y direction, and may calculate a deviation σ indicating the scale of variations on the basis of the possible values of the acceleration amplitudes in the X direction and the acceleration amplitudes in the Y direction which are obtained in the first to N-th measurements. Alternatively, the portable terminal 1 may search for identification information (material ID) of a material such that $A_{xy}$, the deviation σ, and the acceleration amplitude $A_z$ in the Z direction fall within the respective ranges for the material. If identification information (material ID) of a material corresponding to the acceleration amplitudes calculated in S113 is not retrieved, the portable terminal 1 may return an error.

The portable terminal 1 may determine that the material ID which is among material IDs determined by using the coefficient of friction and the coefficient of restitution and which is included in material IDs determined by using the acceleration amplitudes is the material ID of the surface on which the portable terminal 1 is put.

The portable terminal 1 may perform the information processing according to the material determined in S114 (S115). For example, the portable terminal 1 may change the strength of vibration in accordance with the material determined in S114. When the material determined in S114 is the dashboard of a vehicle, the portable terminal 1 may output alert sound. When the material determined in S114 is a carpet, the portable terminal 1 may switch the operation performed when the portable terminal 1 receives an incoming call, from vibration to sound effects. When a request to search for a position at which the portable terminal 1 is put is received, the process of determining a material is performed, and information about the determined material is output by using voice, enabling a user to easily find the portable terminal 1.

The portable terminal 1 according to the present embodiment as described above is capable of determining the material of an object on which the portable terminal 1 is put and performing a process according to the determined material.

The present invention is not limited to the above-described embodiment. For example, in the present embodiment, the process of determining a material is performed on the basis of information about a coefficient of friction, a coefficient of restitution, and acceleration amplitudes which are calculated by the portable terminal 1. Information about the coefficient of friction, the coefficient of restitution, and the acceleration amplitudes which are calculated may be transmitted to a server. The server may determine a corresponding material on the basis of the transmitted information about the coefficient of friction, the coefficient of restitution, and the acceleration amplitudes, and may transmit the result to the portable terminal 1. Alternatively, the portable terminal 1 may transmit the recorded acceleration data to the server, and the server may calculate information about a coefficient of friction, a coefficient of restitution, and acceleration amplitudes.

What is claimed is:

1. A portable terminal comprising:
an acceleration measuring unit configured to measure acceleration of the portable terminal;
a calculating unit configured to calculate a first feature value for in-plane directions in which the portable terminal is in contact with an object and a second feature value for an out-of-plane direction on the basis of an acceleration measured by the acceleration measuring unit in a state in which the portable terminal is put on the object, when the portable terminal is vibrated; and
a specifying unit configured to specify a material of the object on the basis of the first feature value and the second feature value,
wherein the portable terminal changes a strength of vibration in accordance with the specified material of the object.

2. The portable terminal according to claim 1,
wherein the specifying unit specifies the material of the object on the basis of the first feature value and the second feature value being calculated by the calculating unit using a memory unit storing a range of the first feature value and a range of the second feature value for each of one or more materials in such a manner that the range of the first feature value and the range of the second feature value are associated with each other.

3. The portable terminal according to claim 1,
wherein the first feature value includes amplitudes of acceleration measured by the acceleration measuring unit for a first direction and a second direction in the in-plane directions, and the second feature value includes an amplitude of acceleration measured by the acceleration measuring unit for the out-of-plane direction.

4. The portable terminal according to claim 1,
wherein the portable terminal comprises a vibration generating unit that vibrates the portable terminal,
the calculating unit calculates a coefficient of kinetic friction between the portable terminal and the object on the basis of force caused by the vibration generating unit in the in-plane directions, acceleration measured by the acceleration measuring unit in the in-plane directions, and a mass of the portable terminal, and
the first feature value includes the coefficient of kinetic friction.

5. The portable terminal according to claim 1,
wherein the calculating unit calculates a coefficient of restitution between the portable terminal and the object on the basis of a speed in the out-of-plane direction before the portable terminal collides with the object and a speed in the out-of-plane direction after the portable terminal collides with the object, the speeds before and after the portable terminal collides with the object being calculated on the basis of the acceleration measured by the acceleration measuring unit, and
the second feature value includes the coefficient of restitution.

6. A portable-terminal condition determining system comprising:
a portable terminal including an acceleration measuring unit configured to measure acceleration;
a calculating unit configured to calculate a first feature value for in-plane directions in which the portable terminal is in contact with an object and a second feature value for an out-of-plane direction on the basis of an acceleration measured by the acceleration measuring unit in a state in which the portable terminal is put on the object, when the portable terminal is vibrated; and
a specifying unit configured to specify a material of the object on the basis of the first feature value and the second feature value,
wherein the portable terminal changes a strength of vibration in accordance with the specified material of the object.

7. A portable-terminal condition determining method comprising:
measuring acceleration in a portable terminal;
calculating a first feature value for in-plane directions in which the portable terminal is in contact with an object and a second feature value for an out-of-plane direction on the basis of the acceleration measured in a state in which the portable terminal is put on the object, when the portable terminal is vibrated;
specifying a material of the object on the basis of the first feature value and the second feature value; and
changing a strength of vibration in accordance with the specified material of the object.

* * * * *